UNITED STATES PATENT OFFICE.

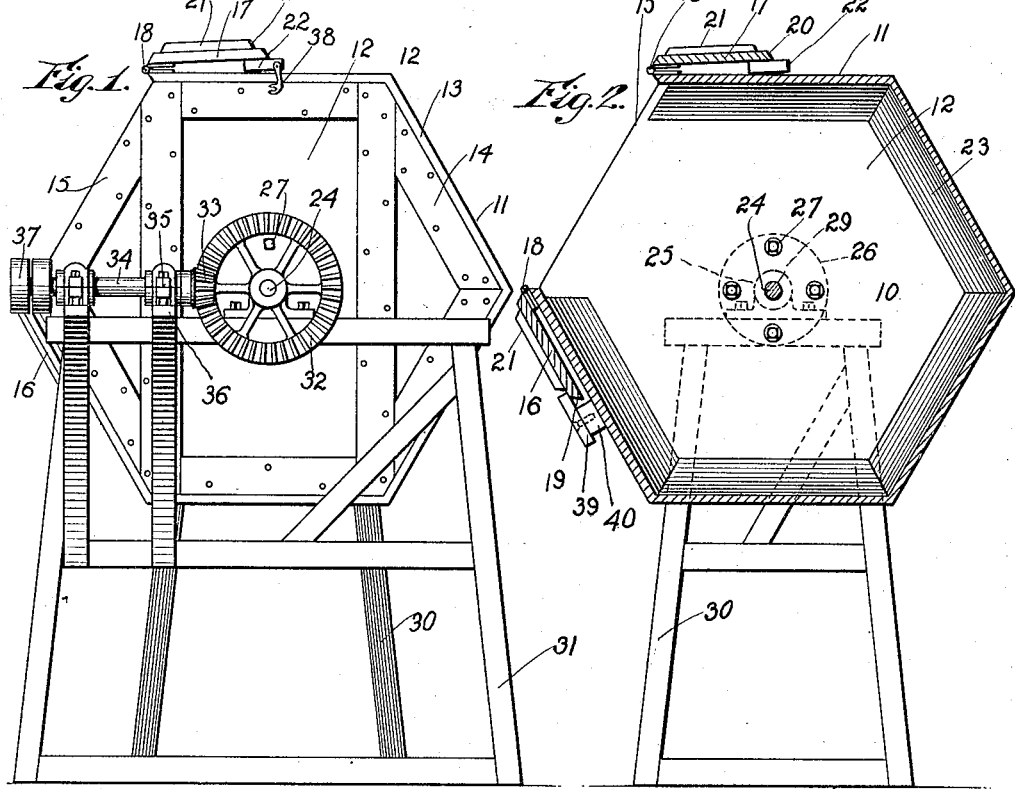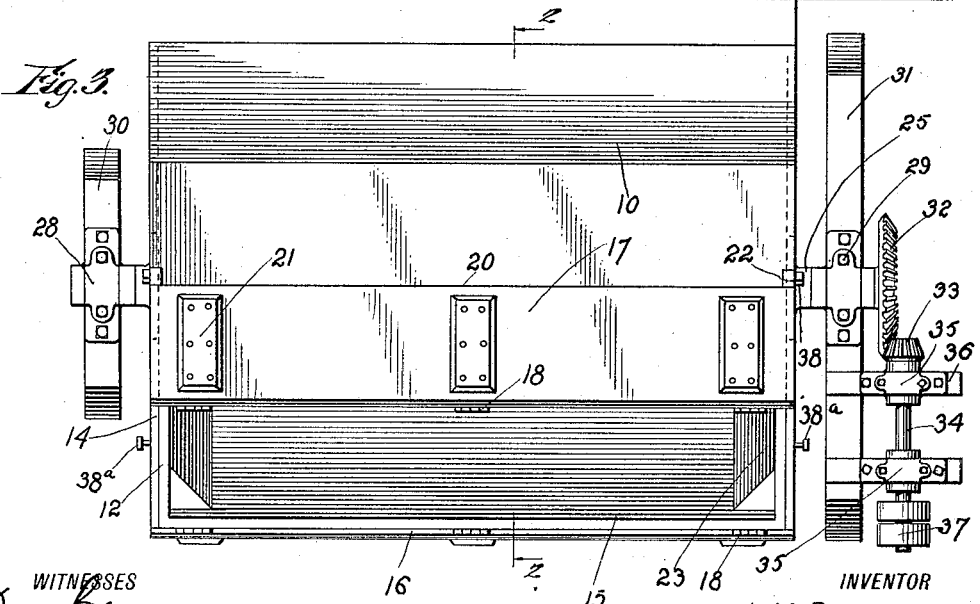

LOUIS MARSHALL BRAYMAN, OF WESTVILLE, NEW HAMPSHIRE.

MIXER.

1,328,119.

Specification of Letters Patent.  Patented Jan. 13, 1920.

Application filed February 27, 1919.  Serial No. 279,660.

*To all whom it may concern:*

Be it known that I, LOUIS M. BRAYMAN, a citizen of the United States, and a resident of Westville, in the county of Rockingham and State of New Hampshire, have invented a new and Improved Mixer, of which the following is a full, clear, and exact description.

This invention relates to mixers, and more particularly a machine of this kind adapted for the mixing of dry materials such as poultry feed.

An object of the invention is to provide a simple, strong and durable mixing machine which can be inexpensively manufactured, which can be constructed of different kinds of materials, and which is compact in form and light in weight.

A further object of the invention is to provide a mixer in which dry materials such as poultry food can be rapidly and efficiently mixed for use, which may be power or hand driven, and which is so constructed that the material can be easily and expeditiously introduced into it and removed therefrom.

A still further object of the invention is to provide a mixer in which the barrel or container for the material to be mixed is so constructed that corners or angles adapted to catch and hold material are avoided, and in which the material, while being mixed, is directed away from the end walls, toward the middle portion of the barrel.

Reference is to be had to the accompanying drawings forming a part of this specification, in which similar characters of reference indicate corresponding parts in all the views, and in which—

Figure 1 is an end view of an embodiment of my invention;

Fig. 2 is a vertical cross-section on the line 2—2 of Fig. 3; and

Fig. 3 is a plan view of an embodiment of the mixer.

Before proceeding to a more detailed explanation of my invention, it should be clearly understood that the machine is primarily designed for use with dry materials. It may be fashioned from wood, sheet metal or any other material adapted for the purpose. Certain of the details of construction shown herein as an exemplification, form no part of the invention, and may be varied as necessary or desirable.

The casing or barrel proper of the mixer is of polygonal form, and of suitable length, depending upon the desired capacity of the machine. As is shown for example, herein, the barrel 10 is of hexagonal cross-section, and has similar side walls 11, and end walls 12 of hexagonal shape. The side walls are nailed or otherwise suitably attached to the end walls and are substantially flush with the edges thereof. The end walls are provided with cross cleats 13 and edge cleats 14, of suitable form, screwed or nailed in position to strengthen the end walls and to assist in securing the side walls firmly to the end walls.

One side, 15, of the barrel, forms the inlet and outlet of the same, and is provided with two similar closures, 16 and 17, attached to the inner edges of the adjacent side walls 11, by means of suitable hinges, 18. The contacting edges, 19 and 20, of the closures 16 and 17, are oppositely beveled, so that when closed, a tight joint is formed. At the inner sides, the closures 16 and 17 have transverse cleats 21, to strengthen them. The closure 17 has at the ends of its edge 20, and projecting beyond the same, fingers 22, which extend over the contacting edges of the closures, when the same are in closed position, to secure the closure 16. The hinge edges of the closures, and the corresponding edges of the adjacent side walls 11, are suitably beveled to form a tight joint.

A number of members 23, of similar triangular cross-section, are arranged within the barrel, along the ends thereof, and each in contact with one of the side walls. The arrangement is such that each member 23 has one side in juxtaposition with an end wall, and an adjacent side in juxtaposition with a corresponding side wall of the barrel, so that the free face of each member is at an angle with an end wall and the corresponding side wall. The contacting extremities of the members 23 are matched, as is clearly shown in Fig. 2. The inner or free faces of the members 23 are shown as flat. If so desired, however, they may be more or less concave.

Extending longitudinally through the barrel, and axially with respect thereto, is a shaft 24. This shaft passes through hubs 25 having flanges 26 and secured to the outer faces of the end walls by means of bolts 27 located in suitable openings of the flanges and the end walls. The ends of the shafts project through the hubs and beyond the end walls, and are mounted in suitable bearings 28 and 29 mounted upon supports or uprights 30 and 31, which carry the barrel and adapt it for rotation when the shaft 24 is turned, it being understood that the shaft and the barrel are keyed or otherwise rigidly secured together. The supports 30 and 31 may be of any suitable kind.

At the end of the shaft 24 projecting beyond the support 31, is shown, for example, a bevel gear 32 in mesh with a bevel pinion 33 rigidly secured upon a second shaft 34. This shaft 34 is journaled in bearings 35 carried by extensions 36 of the support 31. The shaft 34 has pulleys 37 for the application of power to drive the mixer. It will be understood that the particular means for applying power, which may be hand-power or mechanical power, to the shaft 24, forms no part of the invention, and may be of any suitable kind.

It will be seen that the material to be mixed can be readily introduced into and removed from the barrel of my mixer, as the opening of the same is substantially one entire side. The closure 17 has suitable latches 38, adapted to engage with headed pins 38ª at the side of the barrel opening to secure the closures 16 and 17 in a closed position, it being understood that the fingers 22 extending over the edge of the closures 16 secures the same. A stop consisting of a pivoted finger 39, mounted upon a block 40 secured upon the side 11, serves to hold the closure 16 in an open position and out of the way.

The material to be mixed is introduced into the barrel, and the closures are secured in closed position. The barrel is then rotated until the material is thoroughly intermingled. It will be seen that as the interior of the barrel presents no corners or edges to catch the material and hold the same, the mixing operation will be greatly facilitated. Furthermore, the inclined inner faces of the members 23 tend to direct the material toward the center of the barrel and away from the ends thereof.

Having thus described my invention, I claim as new, and desire to secure by Letters Patent:—

1. A mixer comprising a barrel of polygonal cross-section, having flat side walls, and end walls at right angles with said side walls, said barrel being mounted to rotate around a longitudinal axis, means for rotating said barrel, and members of substantial thickness located within said barrel and each secured permanently to an end wall and to a side wall of said barrel, and presenting a surface at an angle with the end wall and the side wall, whereby material in said barrel, when the mixer is in operation, is directed away from the ends thereof, the adjacent ends of said members being matched and contiguous.

2. A mixer comprising a barrel of polygonal cross-section, having flat side walls, and end walls at right angles with said side walls, said barrel being mounted to rotate around a longitudinal axis, means for rotating said barrel, and members of substantial thickness located within said barrel and each secured permanently to an end wall and to a side wall of said barrel, and presenting a surface at an angle with the end wall and the side wall, whereby material in said barrel, when the mixer is in operation, is directed away from the ends thereof, the adjacent ends of said members being matched and contiguous, said barrel having a door-opening occupying one entire side thereof, and a closure for said opening.

LOUIS MARSHALL BRAYMAN.